US012638583B2

(12) United States Patent
Van Der Steen et al.

(10) Patent No.: US 12,638,583 B2
(45) Date of Patent: May 26, 2026

(54) FLEXIBLE ULTRASOUND ARRAY FOR MEASURING A CURVED OBJECT WITH SCATTERING ELEMENT

(71) Applicant: Nederlandse Organisatie voor toegepast-natuurwetenschappelijk onderzoek TNO, 's-Gravenhage (NL)

(72) Inventors: Jan-Laurens Pieter Jacobus Van Der Steen, Eindhoven (NL); Laurens Christiaan Johannes Maria Peters, Wijchen (NL); Paul Louis Maria Joseph Van Neer, Bergschenhoek (NL); Arno Willem Frederik Volker, Delft (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 312 days.

(21) Appl. No.: 18/682,805

(22) PCT Filed: Aug. 12, 2022

(86) PCT No.: PCT/NL2022/050468

§ 371 (c)(1),
(2) Date: Feb. 9, 2024

(87) PCT Pub. No.: WO2023/018332

PCT Pub. Date: Feb. 16, 2023

(65) Prior Publication Data

US 2024/0345247 A1    Oct. 17, 2024

(30) Foreign Application Priority Data

Aug. 13, 2021    (EP) ..................................... 21191229

(51) Int. Cl.
| | | |
|---|---|---|
| *G01S 15/89* | (2006.01) | |
| *G01S 7/52* | (2006.01) | |
| *G01S 7/521* | (2006.01) | |

(52) U.S. Cl.
CPC ...... *G01S 15/8927* (2013.01); *G01S 7/52079* (2013.01); *G01S 7/521* (2013.01); *G01S 15/892* (2013.01); *G01S 15/8993* (2013.01)

(58) Field of Classification Search
None
See application file for complete search history.

(56) References Cited

U.S. PATENT DOCUMENTS

| | | | | |
|---|---|---|---|---|
| 2019/0175152 A1* | 6/2019 | Smith | .................. | A61B 8/4483 |
| 2020/0278327 A1* | 9/2020 | Prus | ....................... | A61B 8/587 |
| 2020/0391244 A1* | 12/2020 | Willey | .................. | G01S 7/5205 |

OTHER PUBLICATIONS

European Patent Office, International Search Report in corresponding International Application No. PCT/NL2022/050468 dated Oct. 24, 2022.

(Continued)

*Primary Examiner* — Eric S. McCall
*Assistant Examiner* — Nigel H Plumb
(74) *Attorney, Agent, or Firm* — Leydig, Voit & Mayer, Ltd.

(57) ABSTRACT

A system and method for acoustically measuring a curved object are described. A flexible sheet is provided with an array of acoustic transducers. The flexible sheet is wrapped around the curved object such that the acoustic transducers acoustically contact the curved object. The acoustic transducers are used to generate and/or measure acoustic waves at variable locations depending on a shape of the curved object. Spatial coordinates of the acoustic transducers are determined while the flexible sheet is wrapped around the curved object. In particular, the spatial coordinates are determined based on respective subsets of travel times used (Continued)

to calculate respective wave directions of the acoustic waves arriving at respective subarrays from a common origin, e.g. scattering element inside the curved object.

15 Claims, 8 Drawing Sheets

(56)  References Cited

OTHER PUBLICATIONS

Xinyue Huang et al., "Deep Learning for Ultrasound E3eamforming in Fiexible Array Transducer," IEEE Transactions on Medical Imaging, vol. 40, No. 11, pp. 3178-3189, Nov. 2021, XP011885241.

Alan J. Hunter et al., "Autofocusing ultrasonic imagery for non-destructive testing and evaluation of specimens with complicated geometries," NDT&E International, vol. 43, No. 2, pp. 78-85, Mar. 1, 2010, XP026833879.

Junjie Chang et al., "Flexible ultrasonic array for breast-cancer diagnosis based on a self-shape-estimation algorithm," Ultrasonics 108 (2020) 106199, XP086266981.

* cited by examiner

FLEXIBLE ULTRASOUND ARRAY FOR MEASURING A CURVED OBJECT WITH SCATTERING ELEMENT

CROSS-REFERENCE TO RELATED APPLICATIONS

This patent application is a U.S. National Phase of PCT International Application No. PCT/NL2022/050468, filed Aug. 12, 2022, which claims priority to European Application No. 21191229.0, filed Aug. 13, 2021, which are both expressly incorporated by reference in their entireties, including any references contained therein.

TECHNICAL FIELD AND BACKGROUND

The present disclosure relates to acoustic systems and methods for measuring a curved object.

Acoustic systems have various applications for measuring objects and materials such as tissue. For example, mammography and other acoustic images can be generated using pulse-echo measurements performed by acoustic transducers. Information about materials and structures inside the object or tissue can be extracted from measured properties of the acoustic waves traversing and/or reflected of material substructures, such as amplitude, frequency, phase and/or time between a transmitted pulse and received echo. When pulse-echo and/or tomographic measurements are performed between different transducers, reconstruction of the ultrasound imaged may be dependent on a priori knowledge of the (relative) positions of the transducers. However, in a conformable, flexible and/or stretchable ultrasound array, the inter-element positions of different transducers may be unknown, impeding reconstruction of the image.

As background US 2020/0278327 A1 describes a phased array calibration for geometry and aberration correction. Various approaches for calibrating the geometry of an ultrasound transducer having multiple transducer elements include: providing an acoustic reflector spanning an area traversing by multiple beam paths of ultrasound waves transmitted from all (or at least some) transducer elements to a focal zone; causing the transducer elements to transmit the ultrasound waves to the focal zone; measuring reflections of the ultrasound waves off the acoustic reflector; and based at least in part on the measured reflections, determining optimal geometric parameters associated with the transducer elements. Unfortunately, the calibration cannot be performed during imaging (in situ).

There is a need for an improved acoustic systems and methods, e.g. allowing to easily measure curved objects having variable shape.

SUMMARY

Aspects of the present disclosure are directed to acoustic systems and methods for measuring a curved object. A flexible sheet comprises an array of transducers distributed over a sheet surface of the flexible sheet for acoustically contacting the curved object. The transducers are configured to generate and/or measure acoustic waves. These waves can be generated and measured depending on variable locations of the transducers relative to each other. Spatial coordinates of the variable locations (in three dimensional space) depend on a deformation of the sheet surface contacting the curved object. As will be appreciated, the a priori unknown (relative) spatial coordinates can be determined by the acoustic system itself using various methods as described herein.

A set of arrival times is determined of acoustic waves arriving at different transducers in the array originating from a common origin. Preferably, the common origin is formed by one or more common scattering elements inside the curved object. Alternatively, or additionally, one or more transducers in the array can be used as common origin. The set of arrival times is collected (divided) into different subsets. Each subset of arrival times is selected to corresponds to a respective subarray of the transducers spanning a respective subarea of the flexible sheet at respective surface coordinates along the sheet surface. Based on the respective subset of arrival times for each subarray of the transducers, a respective wave direction is determined at which respective parts of the acoustic waves arrive at the respective subarea originating from the common origin. A modelled shape of the sheet surface can be determined based at least in part on the respective wave direction as function of the surface coordinates of a respective subarea. The spatial coordinates of the transducers can be determined based on the modelled shape of the sheet surface. Alternatively, or in addition to the wave directions, also other aspects can be derived from the arrival times such as the distance between respective transducers and the common scattering element and/or (direct and indirect) distances to other transducers. Also other or further features may be used in modelling the shape of the sheet surface. For example, predetermined surface coordinates and distances of the transducers may help to constrain the fitted shape. For example, the shape can be constrained to a predetermined (functional) parameterization, or left as a freeform mesh of interconnected subarrays.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1A:
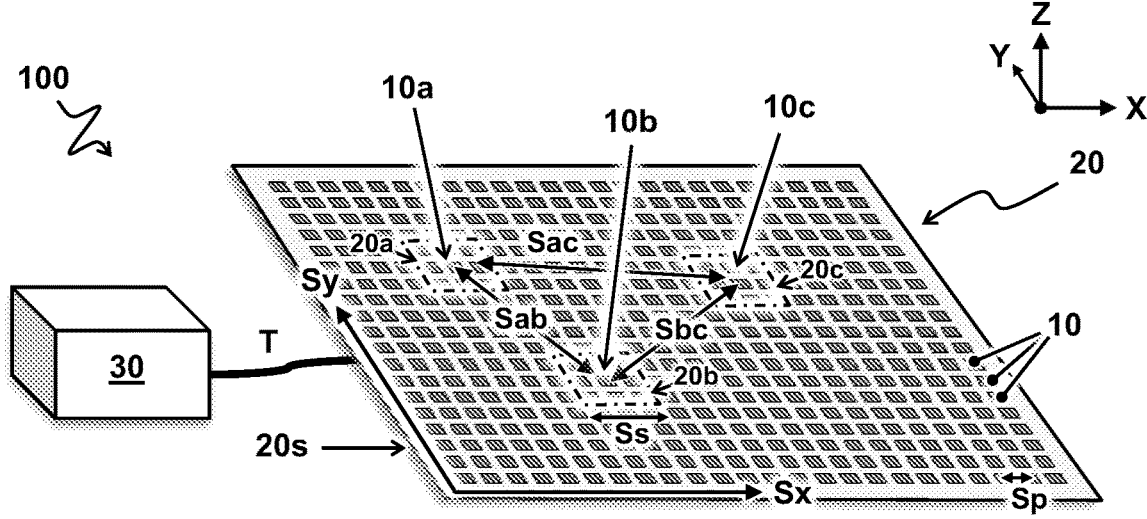
FIG. 1A illustrates a perspective view of an acoustic system comprising a flexible sheet with an array of transducers.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1B:
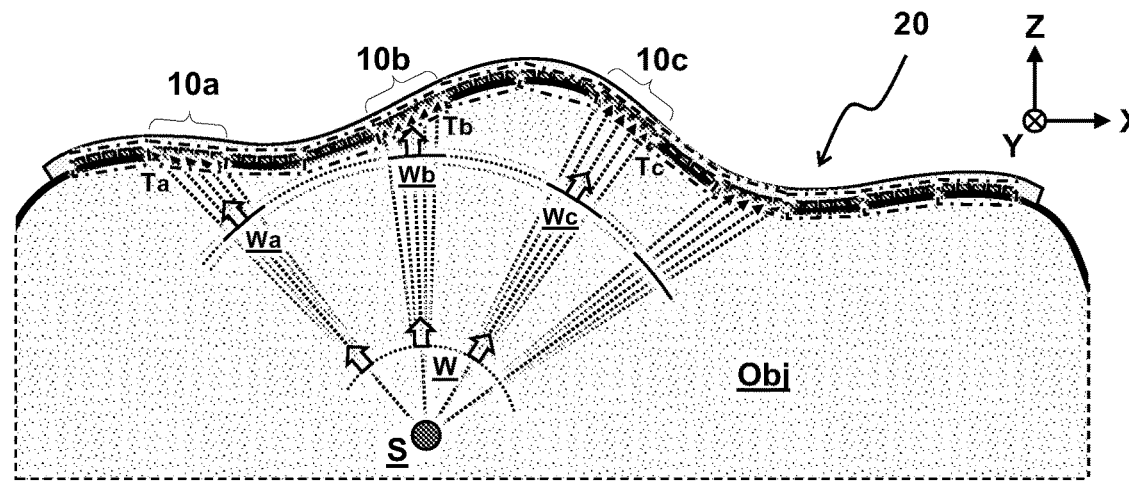
FIG. 1B illustrates a cross-section view of the flexible sheet with the transducers contacting a curved object, and measuring acoustic waves originating from a common scattering element.
Figure 1C:
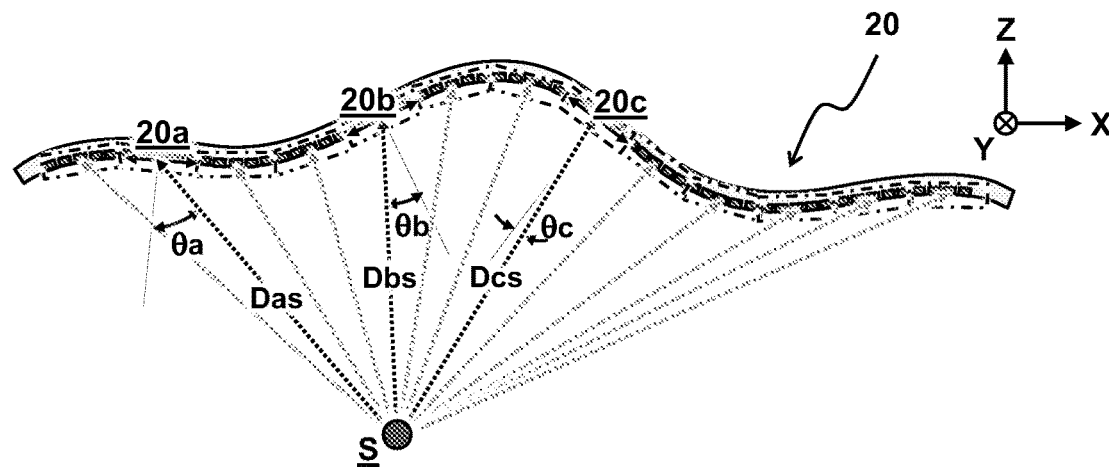
FIG. 1C illustrates wave directions at which the acoustic waves arrive at different subareas of the flexible sheet, and distances to the common scattering element.

FIG. 1A illustrates a perspective view of an acoustic system 100 comprising a flexible sheet 20 with an array of transducers 10. FIG. 1B illustrates a cross-section view of the flexible sheet 20 with the transducers 10 contacting a curved object "Obj", and measuring acoustic waves "Wa", "Wb", "Wc" originating from a common scattering element "S". FIG. 1C illustrates wave directions θa, θb, θc at which the acoustic waves arrive at different subareas 20a,20b,20c of the flexible sheet 20, and distances "Das", "Dbs", "Dcs" to the common scattering element "S".

In some embodiments, an array of transducers 10 is distributed over a sheet surface 20s of a flexible sheet 20 for acoustically contacting the curved object "Obj". In one embodiment, the transducers 10 are configured to generate and/or measure acoustic waves "W" at variable locations relative to each other. For example, one or more of the acoustic transducers generate acoustic waves and one or more of the acoustic transducers measure acoustic waves. Preferably, each acoustic transducer is capable of both generating and measuring acoustic waves. In one embodiment, some acoustic transducers are used for generating acoustic waves and other acoustic transducers are used for measuring the generated acoustic waves. The roles of the acoustic transducers, either generating or measuring acoustic waves, may be fixed or variable, or the acoustic transducers may perform both roles simultaneously or consecutively. It can also be envisaged that the acoustic transducers 10 distributed over the flexible sheet 20 are only used for measuring. For example, the acoustic waves scattering from the common scattering element "S" may originate from a separate source of acoustic waves, e.g. separate from the flexible sheet.

As may be noted, the spatial coordinates (X,Y,Z) of the variably located transducers in three dimensional space are dependent on a deformation of the sheet surface 20s, which in turn may be related to the curved object "Obj" being contacted. For example, the flexible sheet 20 is wrapped at least partially around the curved object "Obj" and/or covers a surface of the object including curvature. This may cause the flexible sheet 20 and array of transducers 10 into a non-planar shape.

In some embodiments, the shape of the flexible sheet 20 and/or (relative) spatial coordinates of the transducers 10 is determined in situ, e.g. using a controller 30 that is operably coupled with the transducers 10 to send/receive electrical signals being converted (transduced) into acoustic signals and vice versa. For example, the controller 30 is configured and/or programmed to executed operational steps in accordance with the methods and systems as described herein. Typically, the controller may be under hardware and/or software control. Aspects of the present disclosure can e.g. be embodied as a (non-transitory) computer-readable medium storing instructions that, when executed by one or more processors, cause a controller to perform the methods described herein.

Some embodiments comprise determining, for different transducers in the array, a set of arrival times "T" of acoustic waves "W" originating from a common point of origin. In a preferred embodiment, e.g. as shown, the common origin is formed by a common scattering element "S" inside the curved object "Obj". For example, the set of arrival times "T" of the acoustic waves "W" are based on a respective time interval between generating acoustic waves "W" by one or more source transducers (in the array and/or separate from the array), and measuring resulting acoustic waves by receiving transducers in the respective subarrays 10a,10b, 10c after being scattered by the common scattering element "S" along a respective path between the source and receiving transducers. Alternatively, or in addition, a common origin can be formed by a direct source of acoustic waves, e.g. one of the transducers in the array or a separate transducer, e.g. at a specific location inside the object, or applied on its perimeter (e.g. on a side of the object opposite the array), and/or separate source transducer sending acoustic waves to the common scattering element "S".

Some embodiment comprise collecting the set of arrival times T into different subsets. In one embodiment, each subset of arrival times "Ta",Tb,Tc corresponds to a respective subarray 10a,10b,10c of the transducers 10 spanning a respective subarea 20a,20b,20c of the flexible sheet 20 at respective surface coordinates (Sx,Sy) along the sheet surface 20s. One embodiment comprises determining, based on the respective subset of arrival times "Ta",Tb,Tc for each subarray 10a,10b,10b of the transducers 10, a respective wave direction θa, θb, θc at which respective parts of the acoustic waves "Wa", "Wb", "Wc" arrive at the respective subarea 20a,20b,20c originating from the common origin, e.g. scattering element "S". Other or further embodiments comprise determining a modelled shape 20m of the sheet surface 20s based at least in part on the respective wave direction θa, θb, θc as function of the surface coordinates (Sx,Sy) of a respective subarea 20a,20b,20c. The spatial coordinates (X,Y,Z) of the transducers 10 can be accordingly determined based on the modelled shape 20m of the sheet surface 20s.

In some embodiments, the shape of the sheet surface $20s$ is modelled based predominantly or exclusively on the respective wave directions $\theta a$, $\theta b$, $\theta c$. In one embodiment, subareas of the sheet surface are modelled, at least initially, facing relative angles with respect to each other based on the respective wave direction. For example, if the common scattering element "S" is at a relatively large distance from a set of subareas, the angles between the subareas may be similar or the same as the relative wave directions. Alternatively, or additionally, the relative position or distance of the common scattering element "S" to one or more of the subareas may be modelled, assumed, or measured. In one embodiment, a position of a modelled scattering element "M" is variable, e.g. determined by fitting and/or iterative procedure. In another or further embodiment, the position of the modelled scattering element "M" is predetermined or otherwise assumed.

Some embodiments comprise determining a respective distance "Das", "Dbs", "Dcs" between a respective subarea $20a,20b,20c$ and the common scattering element "S" or other point of origin. Accordingly, the modelled shape $20m$ of the sheet surface $20s$ can be determined or constrained based at least in part on one or more of the respective distance "Das", "Dbs", "Dcs". In one embodiment, the respective distance is determined to a center of a respective subarea. In another or further embodiment, an average distance is determined based on one or more, preferably all, transducers in the subarray. In principle, also any other position relative to a subarea can be selected. In principle, if the distance between the common scattering element "S" and one of the subareas is measured, also the other distances can be derived. Preferably, each of the distances "Das", "Dbs", "Dcs" is respectively measured to improve constraint on the modelled shape. In principle, if the distances between the common scattering element "S" and each of the transducers 10 can be accurately measured, this can be used to determine the modelled shape $20m$ even independent of the respective wave direction $\theta a$, $\theta b$, $\theta c$. However, in practice this may be difficult to accurately model, e.g. due to limitations in the accuracy and/or interference. So it is preferable, to use the one or more measured distances as a further constraint on a modelled shape $20m$ which based at least in part on the wave directions.

As will be appreciated, the respective distance "Das", "Dbs", "Dcs" between the respective subarea $20a,20b,20c$ and the common scattering element "S" can be determined based on the arrival times "Ta",Tb,Tc. For example, a respective distance "Das", "Dbs", "Dcs" between a respective subarea $20a,20b,20c$ and the common scattering element "S" is determined based on a time interval between the generating and measuring of the respective acoustic wave. In some embodiments, at least one transducer in each subarray $10a,10b,10c$ is configured to generate a respective acoustic wave and measure a resulting acoustic wave "Wa", "Wb", "Wc" reflected back from the common scattering element "S", wherein a respective distance "Das", "Dbs", "Dcs" between the respective subarea $20a,20b,20c$ and the common scattering element "S" is determined based on a time interval between the generating and measuring of the respective acoustic wave.

In one embodiment, the time interval between sending and receiving acoustic waves at a respective subarray $10a$ corresponds to a roundtrip time $2*Tas$. For example, a (one-way) travel time "Ta" it takes for acoustic waves "Wa" to travel from the common scattering element "S" to the subarray $10a$ is calculated as half the roundtrip time. In another or further embodiment, a distance "Das" between the corresponding subarea $20a$ and the common scattering element "S" is calculated by multiplying the one-way travel time by a (wave) velocity "C". Equivalently, the roundtrip time can be multiplied by an "effective" velocity which in case of a pulse echo can be taken as half the actual wave velocity in the medium.

In principle, the velocity of the acoustic waves can be predetermined, measured, assumed, and/or modelled (e.g. as a parameter). In one embodiment, a velocity of the acoustic waves is predetermined, e.g. using a measurement through the object, or a model object, between a pair of transducers at a known distance there between. In another or further embodiment, a velocity of the acoustic waves is measured using one or more pairs of transducers in the array, e.g. by assuming that the surface distance between closest neighboring transducers is similar or the same as the distance through the object. In another or further embodiment, a velocity of the acoustic waves is assumed, e.g. based on known wave transmission characteristics of the object. In another or further embodiment, a velocity of the acoustic waves is used as parameter in a modelling of the sheet layout/shape. In some embodiments, the velocity "C" is assumed to be constant throughout the object. In other or further embodiments, the velocity "C" can be variable, e.g. depending on substructures inside the object. For example, the substructures can be determined by the acoustic system itself, e.g. iteratively In some embodiments, acoustic waves generated by one source transducer are measured by multiple receiver transducers also in different subarrays. This may provide data faster than only measuring reflected waves back to the same subarray. In one embodiment, one or more transducers in a first subarray $10a$ are configured to generate a respective acoustic wave; and transducers in a (separate) second subarray $10b$ and third subarray $10c$ are configured to measure a respective acoustic wave refracted (or reflected) off the common scattering element "S". In another or further embodiment, transducers in the first subarray $10a$ are also configured to measure a respective acoustic wave reflected back from the common scattering element "S". For example, this roundtrip wave can be used to determine a respective roundtrip time and/or distance "Das" between the first subarray $10a$ and the common scattering element "S". Using this information, also the distances "Dbs", "Dcs" between the common scattering element "S" and the other subarrays $10b,10c$ can be determined. For example, by subtracting half the roundtrip time $10a{\rightarrow}S{\rightarrow}10a$ from the travel time between different transducers $10a{\rightarrow}S{\rightarrow}10B$, the one way travel time (or distance) between the scattering element and the second subarray $S{\rightarrow}10B$ can be obtained. Alternatively, or in addition, to determining one or more distances "Das", "Dbs", "Dcs" to the common scattering element "S", also other or further constraints can be used in combination with the wave directions $\theta a$, $\theta b$, $\theta c$ to determine the modelled shape $20m$.

In some embodiments, each transducer or subarray of transducers has a set of predetermined surface coordinates (Sx,Sy) along the sheet surface $20s$. Typically, the spatial coordinates (X,Y,Z) of the acoustic transducers 10 are determined (while the flexible sheet 20 is wrapped around the curved object "Obj") based at least in part on the predetermined surface coordinates (Sx,Sy). In one embodiment, the surface coordinates (Sx,Sy) comprise two dimensional coordinates of a respective position of each transducer and/or subarray, e.g. a set of absolute (X,Y) positions as measured from an origin on the sheet and/or relative positions measured between transducers. In another or further embodiment, the surface coordinates (Sx,Sy) comprise a sequence or relative position of each transducers from which the actual position can be calculated, e.g. in combination with known distances between the transducers.

In other or further embodiments, transducers in the array have predetermined surface distances there between along the sheet surface 20s (e.g. indicated by "Sp", "Ss", "Sab", "Sac", "Sbc"). One embodiment comprises determining the spatial coordinates (X,Y,Z) of the acoustic transducers 10 (while the flexible sheet 20 is wrapped around the curved object "Obj") based at least in part on the predetermined surface distances. In one embodiment, the predetermined surface distances comprise a distance "Sp" between (nearest) neighboring transducers, e.g. a fixed or variable periodic distance. For example, a respective surface distance "Sab", "Sac", "Sbc" between any set of transducers or subarray 10a,10b,10c is calculated based on the periodic distance "Sp" and a set of relative surface coordinates (e.g. counting the number of transducers along a row or column). In another or further embodiment, the respective surface distance "Sab" between a set of transducers or subarrays 10a,10b is calculated based on a table storing a respective (absolute) surface position (Xa,Ya;Xb,Yb) of each transducer or subarray (e.g. measured in millimeter from an origin). For example, the absolute surface positions from the table can be subtracted to determine a relative position ($\Delta$Xab=Xa−Xb; $\Delta$Yab=Ya−Yb) between transducers, and the distance can be calculated using Pythagorean theorem (Dab$^2$=$\Delta$Xab$^2$+$\Delta$Yab$^2$). In another or further embodiment, a table is used which directly stores for one or more (preferably each) transducer the respective surface distance Dab to one or more, preferably all, other transducers in the array. In this way, the surface distance can be quickly retrieved for any pair of transducers and/or subarrays. As will be understood, the predetermined surface coordinates (Sx,Sy) and/or distances are preferably measured along the surface of the flexible sheet 20 when the sheet is flat, e.g. placed on a horizontal flat surface. Typically, the distances along the flexible sheet may represent maximum distances which can be shortened when the sheet is curved around the object. The distance through the object may be referred as the direct Euclidian distance (shortest line segment), e.g. shorter than a surface distance along the curved sheet surface.

In some embodiments, the flexible sheet 20 is stretchable allowing a variable surface distance between the acoustic transducers 10 along the sheet surface 20s. In one embodiment, the acoustic transducers 10 are further configured to generate and/or measure guided waves traveling inside and/or along the sheet surface 20s for determining the variable surface distance Dab. In another or further embodiment, distances between the transducers along the sheet surface are measured, preferably using guided waves traveling along and/or inside the flexible sheet 20 or another interface/connection between the transducers. In one embodiment, waves for measuring transducer inter-distance comprise Lamb waves, e.g. extensional A0 and/or flexural S0 guided waves. In another or further embodiment, waves for measuring transducer inter-distance comprise interface waves e.g. Scholte waves traveling along the sheet/tissue interface. If the sheet is used in combination with a solid the interface the waves can be referred to as Stoneley waves. Regular compressional waves for tissue, or compressional/shear waves when the sample is solid can also be used to determine the 3D shape of the transducer sheet. For example, the measured distance between transducers can be used as an alternative to the predetermined distances, or used in addition for correcting predetermined distances in case of stretching/compression. In particular, for the case of a stretchable transducer sheet, it can be advantageous to determine the distances between the transducers on the transducer sheet separately from the 3D shape of the transducer sheet by using guided waves traveling along the transducer sheet for the former and using bulk waves compressional waves/shear waves for the latter. As one advantage, for the inversion of the 3D shape, the minimum degrees of freedom may be used, allowing for the reconstruction of more complex 3D shapes of the transducer sheet or a more robust reconstruction process.

Some embodiments (not shown) comprise determining the spatial coordinates (X,Y,Z) of the acoustic transducers 10 based at least in part on a set of travel times of the acoustic waves sent directly (e.g. along a straight line through the object, not via the common scattering element "S") between different transducers, e.g. of different subarrays. For example, the transducers and/or subarrays at least partially face each other at different sides of the curved object "Obj". One embodiment comprises using a subarray of receiving transducers to determine a respective wave direction of acoustic waves sent from a specific one or more source transducers. In this way an angle of the receiving subarray with respect to the one or more source transducers can be determined, similar as for the scattering element. Another or further embodiment comprise determining a set of Euclidian (direct) distances through the object between different transducers based on the set of travel times, e.g. by multiplying by the wave velocity "C".

Typically, a travel time can be determined based on a measured time difference between a first time stamp of sending an acoustic wave at a first transducer, and a second time stamp of receiving the acoustic wave at the same or other transducer. For example, the travel time can be determined for acoustic waves travelling of back and forth between a transducer and the scattering element, and/or travelling between a pair of transducers, and/or travelling between one transducer, the scattering element, and another transducer. The travel time may also be referred to as time-of-flight. The same acoustic wave (or another acoustic wave), sent from the first acoustic transducer, can also be received by a third acoustic transducer resulting in another time stamp used to determine a travel time between the first and third acoustic transducers. This can be done for each transducer in an array to get a subset of travel times. Similarly, a travel time can be determined between the second and third transducers. These measurements can be performed sequentially and/or in parallel between any pair of transducers in the array and/or via at least one common scattering element, to yield a desired set of travel times. For example, acoustic waves can be sent with unique signatures (e.g. frequency) to distinguish a respective origin of the acoustic wave. Travel times can also be determined in the opposite direction for any pair. Also an average or median travel time can be determined between any pair by repeating the measurement in the same or opposite direction. For example, this can also be done to alleviate any noise.

In some embodiments, the acoustic system 100 is configured to function as a reflection based acoustic device. In other or further embodiments, the acoustic system 100 is configured to function as a tomography based acoustic device. Also other or further types of acoustic devices can be envisaged, such as a photoacoustic device. In principle, each acoustic transducer may comprise one or more acoustic elements, e.g. capable of converting between acoustic and electric signals. For example, each acoustic element may comprise a piezoelectric structures, membrane, et cetera.

Preferably, each subarray is formed by an area having multiple acoustic transducers, e.g. at least two, four, ten, twenty, fifty, hundred or more (adjacent) transducers forming a localize array. Typically, a respective subarray may be formed on a local subarea of the sheet between 1 and 1000 mm², preferably between 10 and 100 mm². For example, a subarray of area 10×10 mm² comprises a local array of hundred transducers with pitch 1 mm.

In a preferred embodiment, the acoustic system 100 is configured to generate an image of the curved object "Obj" using the array of acoustic transducers 10, e.g. using the same or other controller. Most preferably, the image is generated based on acoustic waves generated and/or measured by the acoustic transducers 10, and their spatial coordinates (X,Y,Z) determined based at least in part on the wave directions $\theta a$, $\theta b$, $\theta c$. For example, the acoustic system 100 is configured as an ultrasound imaging device. Typically, the image includes structures and/or properties measured inside the curved object "Obj" using the array of acoustic transducers 10. Also other measurements of the curved object "Obj" surface and/or interior can be envisaged. Preferably, measured properties of the acoustic signals include one or more of an arrival time, amplitude, frequency, and/or phase of the acoustic signals. For example, the (same or other) controller is configured to generate an image or other measurement of structures and/or properties measured inside the curved object "Obj" using a set of amplitudes of the (same or other) acoustic waves "W" sent through the curved object "Obj" between different transducers (tomographic and/or reflection), or back to the same transducer (reflection).

As will be appreciated, the measured signals (and specific processing of those signals, e.g. to produce an image) may depend on the actual (relative) locations of the transducers. For example, in a tomographic measurement, an amplitude or other property of the acoustic signals between a pair of transducers can be processed to determine structures and/or properties of material in a path between the transducers, wherein the origin and destination of the path is determined by the spatial locations of the transducers relative to the object. For example, in a reflection measurement, an echo time, e.g. in combination with amplitude, or other property of the acoustic back to the same or other transducer can be processed to determine structures and/or properties of material in the reflection path, wherein the origin and destination of the path is determined by the spatial locations of the one or more transducers relative to the object. When the respective paths of different signals can be located, e.g. mapped to the object, the signals may be combined to generate the image or other measurement. Accordingly, the measurements of structures and/or properties inside the object can be processed based on the measured acoustic signals (e.g. reflection and/or tomographic) in accordance with the spatial coordinates (X,Y,Z) of the transducers determined as described herein.

In one embodiment, the imaging or other measurement of the object is performed subsequent to determining the spatial coordinates (X,Y,Z) of the acoustic transducers 10. In another or further embodiment, the spatial coordinates (X,Y,Z) of the acoustic transducers 10 are determined while the measurement of the curved object "Obj" takes place; or intermittently between such measurements. For example, tomographic and/or reflection based measurements can be performed on a body while allowing the body to change shape (e.g. due to breathing motion) by constantly updating the measured positions of the transducers. In principle the same or similar acoustic signals used for determining the spatial coordinates can also be used in imaging the object. For example, structures and/or properties inside the object may be determined based on reflection and/or absorption of acoustic waves between the same or different transducers.

In some embodiments, the modelled shape 20m of the flexible sheet 20 is determined by a constrained fit which uses the wave directions $\theta a$, $\theta b$, $\theta c$ as input. Various constraints can be applied to the modelled shape 20m for allowing a convergent fit such as the predetermined surface distances between different subarrays. In one embodiment, the model is constrained by assuming a continuity of the sheet surface and/or its curvature. For example, the sheet is modeled as an interconnected mesh of subarrays. In another or further embodiment, the model is constrained by a maximum curvature (e.g. minimum radius) of the sheet and/or object. For example, the sheet is assumed to have a certain flexibility and/or bendability. For example, the object is assumed to have a certain maximum curvature (e.g. minimum radius). In another or further embodiment, the model is constrained by a maximum stretchability of the flexible sheet 20. For example, the flexible sheet 20 can be essentially not stretchable so any predetermined distances along the sheet surface can be fixed; or the flexible sheet 20 can have some stretchability so predetermined distances along the sheet surface can be variable, e.g. adjusted by a variable scaling factor according to the model. In some embodiments, the model is constrained by predetermined locations (surface coordinates) of the transducers on the surface. For example, the predetermined locations are set in the model as a constraint on the maximum distances between transducers through the object and/or fixed distances along the sheet surface. Instead of a freeform surface, the shape can be restricted to a specific shape, e.g. spherical, cylindrical, et cetera. This may limit the number of free parameters to allow a more constrained (easier) fit.

In one embodiment, the fit is performed in an iterative procedure, e.g. minimizing a difference between the actual measurements and expected measurements based on the modelled shape 20m and/or scattering element "S". In another or further embodiment, the fit is performed analytically, e.g. directly calculating a best fit. Also combinations of calculations and/or fit routines are possible. Also other algorithms such as machine learning/artificial intelligence can be used, e.g. to calculate a most probable shape of the flexible sheet. In some embodiments, multiple fits are performed for different subsets of the transducers to determine a local shape or curvature in corresponding subsection areas of the sheet. For example, the multiple fits can be combined to provide the overall shape. In some embodiments, the fit is performed globally using all measurements. For example, this may be performed after a general shape is determined based on local fits, or a predetermined general shape of the object.

One embodiment comprises determining a set of current spatial coordinates (X,Y,Z) of the acoustic transducers 10 by adjusting predetermined spatial coordinates (X,Y,Z) in accordance with the wave directions $\theta a$, $\theta b$, $\theta c$. For example, a selection of one or more predetermined shapes, such as a sphere, cylinder, et cetera, can be input into the controller as an initial assumed shape. This can make it easier to fit the shape. In another or further embodiment, the set of predetermined spatial coordinates comprise previously measured and/or fitted coordinates of the acoustic transducers 10. For example, the spatial coordinates of the acoustic transducers 10 and/or modelled shape 20m are continuously or intermittently measured or updated to keep track of an object which can change shape (e.g. the body when breathing). Alternatively or in addition to modelling the sheet surface as a (freeform) mesh, it can also be envisaged to model the sheet surface as a continuous parametrized surface, e.g. according to the surface equation of a predetermined shape.

In some embodiments, the modelled shape is constrained in the fit by a predetermined parametric shape or function. One embodiment comprises calculating the modelled shape 20m based on a predetermined parameterized shape having a set of variable scaling parameters and/or coordinates. For example, the coordinates may include an (x0,y0,z0) origin of the shape. Using a parametrized shape may limit the number of free parameters compared to a more general mesh. For example, the set of scaling parameters and/or coordinates is fitted in accordance with wave directions θa, θb, θc and/or other measurement or constraints. In some embodiments, the modelled shape 20m can be parameterized as a (subsection area of) a sphere or ellipsoid. An ellipsoid is a surface that may be obtained from a sphere by deforming it by means of directional scaling, or more generally, of an affine transformation. For example, an ellipsoid may be uniquely defined by six parameters (x0,y0,z0,a,b,c). These may be determined by a set of at least seven independent measurements. In practice the information in the measurements may not be orthogonal and the signal-to-noise (SNR) may be limited, so more measurements may be needed. For example, the acoustic system is used to measure a (breast) tissue. In this case an initial mesh shape and/or parametrized functional surface may be determined using part of a spherical surface. In other or further embodiments, the curved object "Obj" may have a tubular or cylindrical shape. For example, the acoustic system can be used to measure inside a pipe which may have unknown or variable diameter. Also other parametrized shapes can be envisages such as a (frusto) conical shape, et cetera. For example, the acoustic system is used to measure other parts of the body, or any other curved object.

Figure 2A:
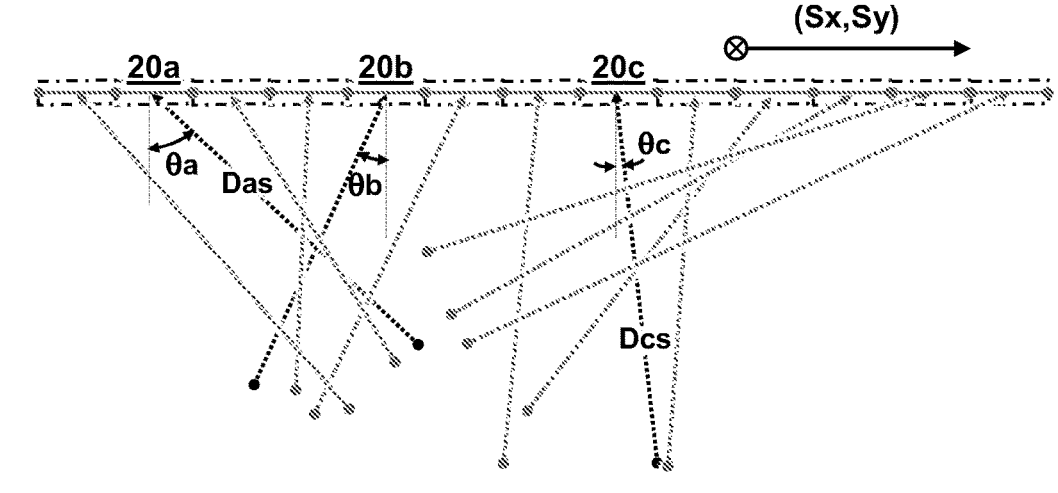
FIGS. 2A-2C illustrate determining a modelled shape of the sheet surface based on the respective wave direction as function of the surface coordinates of a respective subarea.
Figure 2B:
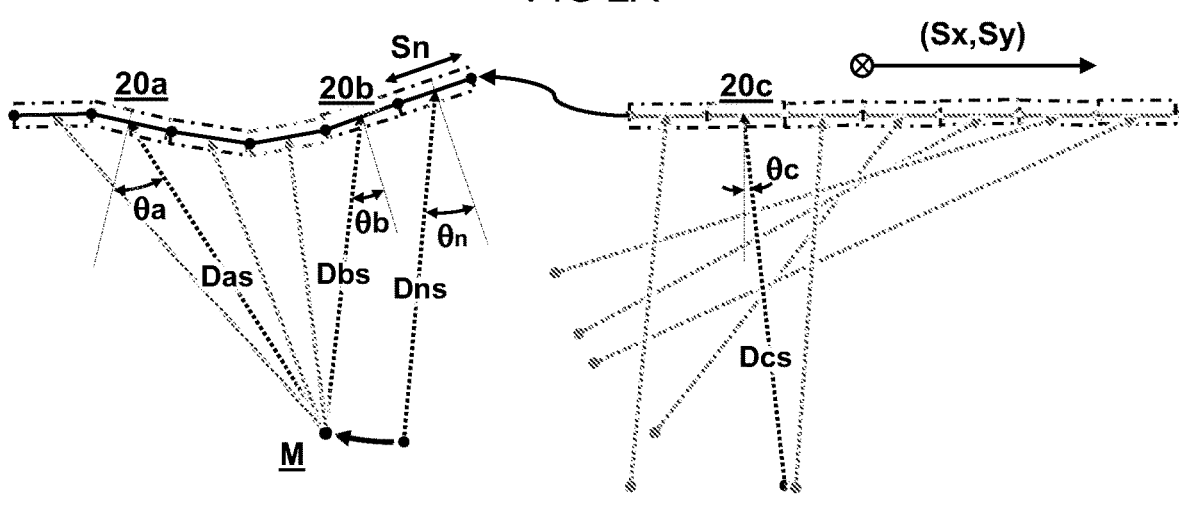
Figure 2C:
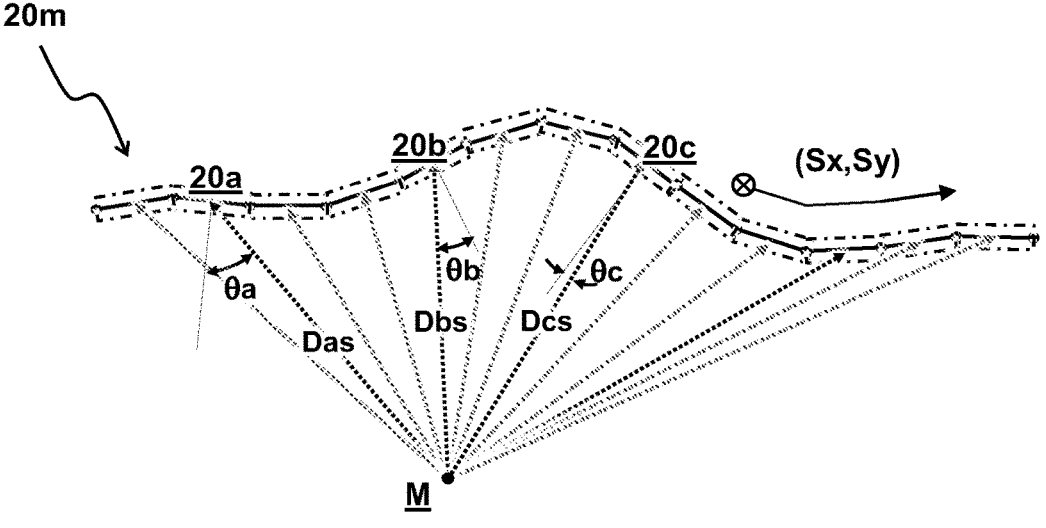

FIGS. 2A-2C illustrate determining a modelled shape 20m of the sheet surface 20s based on the respective wave direction θa, θb, θc as function of the surface coordinates (Sx,Sy) of a respective subarea 20a,20b,20c.

In some embodiments, determining the modelled shape 20m comprises determining a set of line segments. In one embodiment, each line segment is kept fixedly connected to a respective subarea 20a,20b,20c. In another or further embodiment, each fixedly connected line segment intersects a respective subarea at a fixed angle corresponding to the respective wave direction θa, θb, θc at which the acoustic waves "Wa", "Wb", "Wc" arrive at the respective subarea 20a,20b,20c. Other or further embodiments comprise orienting the subareas 20a,20b,20c to intersect their fixedly connected line segments at a common point of origin "M" corresponding e.g. to a model of the common scattering element "S" or other origin.

In some embodiments, one or more, preferably all, of the line segments are modelled having a fixed length corresponding to a distance "Das", "Dbs", "Dcs" between the respective subarea 20a,20b,20c and the common scattering element "S". In one embodiment, the subareas 20a,20b,20c are oriented and/or translated to overlap respective ends of the fixedly connected and fixed length line segments at the common point of origin M. In principle, the position and orientation of each subarea can be uniquely determined using the direction and length of the fixedly connected line segments, e.g. without requiring further predetermined knowledge of the subarrays. For example, not only the orientation, but also the position of the subareas can be varied to match the direction and length of the line segments to a common point of origin.

In some embodiments, the subareas 20a,20b,20c in the modelled shape 20m are oriented in accordance with their respective wave direction θa, θb, θc while keeping adjacent subareas 20a,20b,20c interconnected (at respective edges there between) in accordance with their size "Sn" and relative position, e.g. surface coordinates (Sx,Sy). In one embodiment, the sizes and/or relative positions of the subareas are determined based on the surface coordinates (Sx, Sy) of the transducers and/or subarrays. In one embodiment, adjacent subareas are interconnected to form a linked chain or mesh. In one embodiment, a sequence of the subareas in the chain or mesh is determined based on their relative position. In another or further embodiment, a length of each chain or mesh element is determined based on the respective size of the subarea. In general, the surface of the sheet may vary in more than one direction. So the mesh may similarly vary in multiple directions. Typically this may involve local stretching and/or compressing of the subareas which can e.g. be modelled as respective tolerances or parameters modifying the predetermined sizes. In one embodiment, the subareas are modelled to form an interconnected (two-dimensional) mesh, having a parameterized or freeform shape.

Figure 3A:
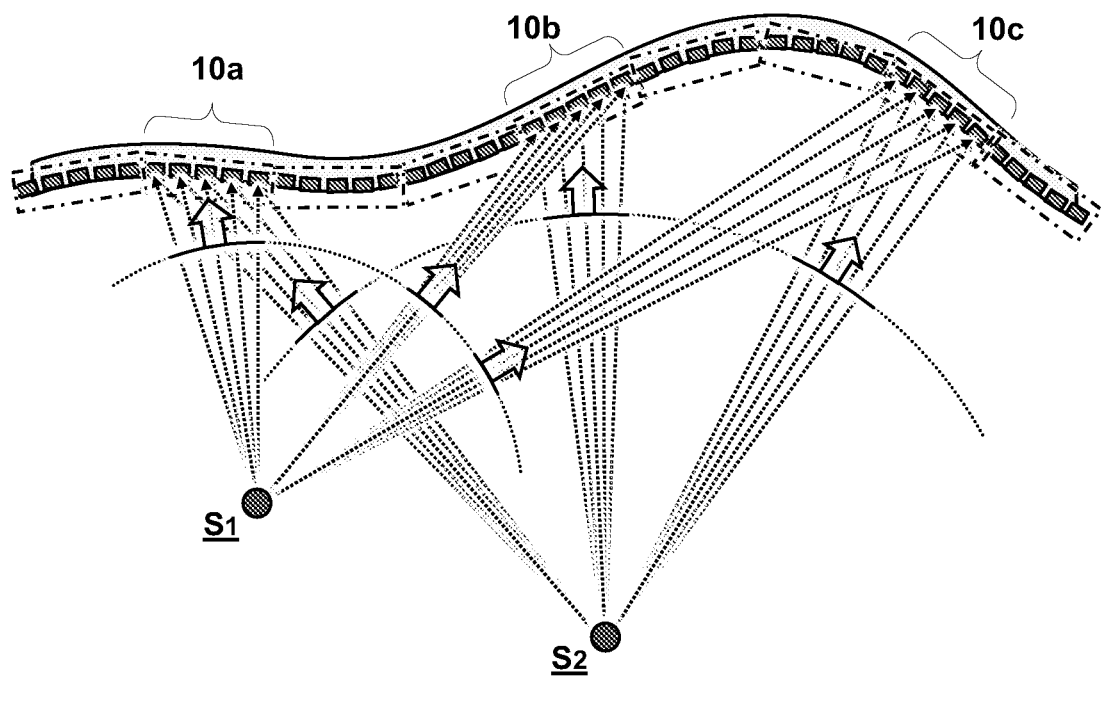
FIGS. 3A and 3B illustrate determining the modelled shape using multiple scattering elements.
Figure 3B:
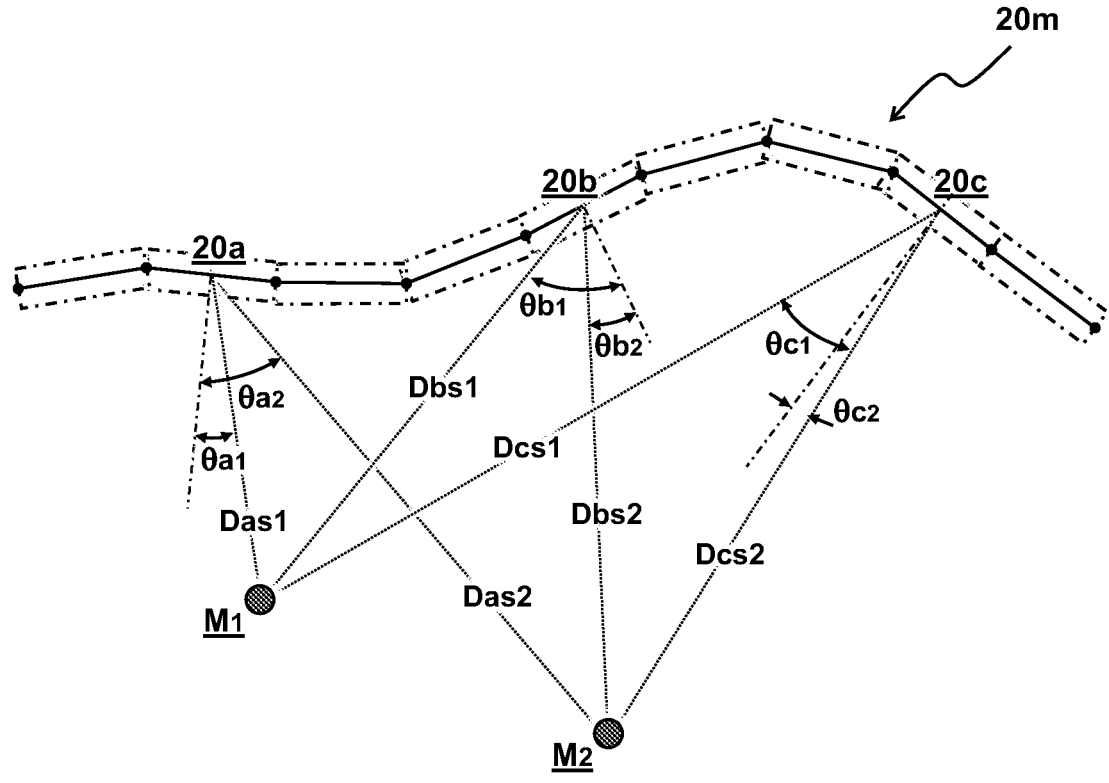

FIGS. 3A and 3B illustrate determining the modelled shape 20m using multiple scattering elements S1,S2

Some embodiments comprise determining a first set of arrival times of acoustic waves "W" having interacted with a first scattering element "S1" inside the curved object "Obj". Other or further embodiments comprise determining a second set of arrival times of acoustic waves "W" having interacted with a distinct, second scattering element "S2" inside the curved object "Obj". One embodiment comprises dividing and/or collecting each set of arrival times into a respective collection of subsets corresponding to the subarrays 10a,10b,10c. Other or further embodiments comprise determining, based on the two collections of subsets for each scattering element "S1",S2 and for each subarray 10a,10b, 10c, a respective at least two wave directions θa1, θb1, θc1; θa2, θb2, θc2 of the acoustic waves arriving at the respective subarray from two directions originating from the first or second scattering element "S1", "S2", respectively. Other or further embodiments comprise determining a modelled shape 20m of the sheet surface 20s based at least in part on the at least two wave directions per subarray as function of the surface coordinates (Sx,Sy) of the subarea. Accordingly, the spatial coordinates (X,Y,Z) of the transducers 10 can be determined based on the modelled shape 20m of the sheet surface 20s.

As will be appreciated, using two or more scattering elements may further constrain the possible modelled shape 20m consistent with the measured directions. Preferably, a set of scattering elements is selected that can be sufficiently isolated. In one embodiment, a set comprising at least two distinct scattering elements is selected wherein the scattering elements that are laterally distant from each other. In this way, the scattering elements can be distinguished, e.g. by windowing the different angles of incoming waves. In one embodiment, a set comprising at least two distinct scattering elements is selected wherein the scattering elements that are at different depths. In this way, the scattering elements can be distinguished, e.g. by windowing the different arrival times.

Other or further embodiments comprise determining a respective at least two distances Das1,Das2; Dbs1,Dbs2; Dcs1,Dcs2 between a respective subarea 20a,20b,20c and at least two distinct scattering elements S1,S2 inside the curved object "Obj". Accordingly, the modelled shape 20*m* of the sheet surface 20*s* can be determined based at least in part on one or more of at least two distances per subarea.

Figure 4A:
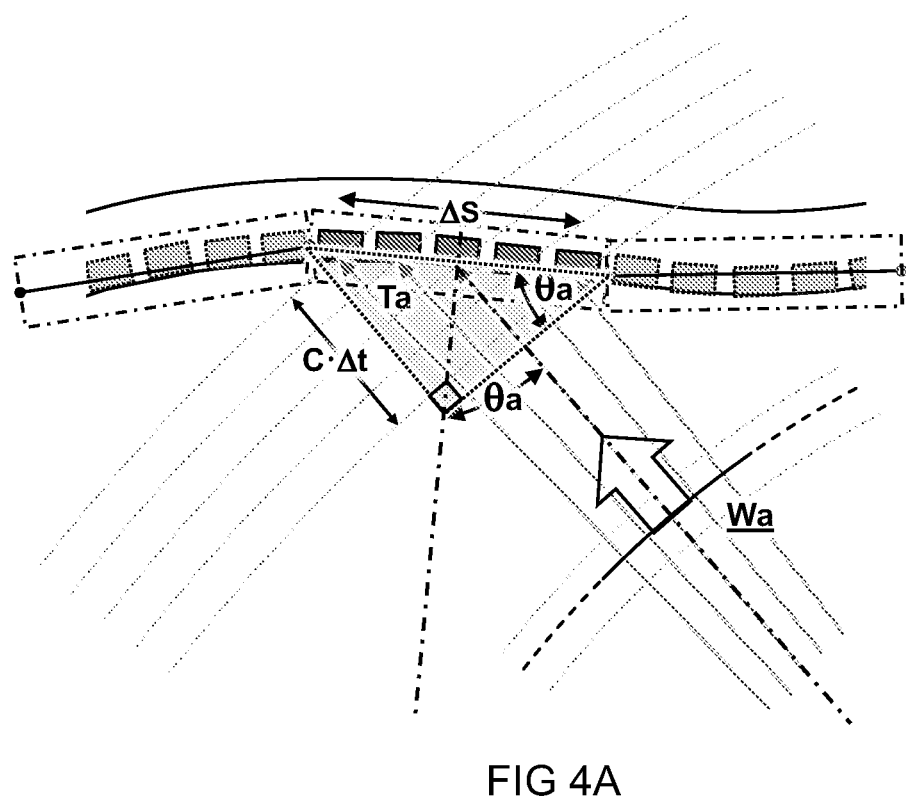
FIG. 4A illustrates determining a respective wave direction based on a subset of arrival times.

FIG. 4A illustrates determining a respective wave direction θa based on a subset of arrival times "Ta". In some embodiments, e.g. as shown, acoustic waves "Wa" arriving from a common point of origin, e.g. scatting element and/or other transducer, may arrive at different times at different transducers in the subarray. In one embodiment, a time difference "Δt" in a subset of arrival times "Ta" depends on the respective wave direction θa of the acoustic waves "Wa", e.g. angle with respect to a surface normal of the subarray. For example, if the acoustic waves "Wa" arrive with a wave direction θa substantially parallel to the surface normal, there may a small or no time difference "Δt" between different arrival times "Ta". On the other hand if the wave direction θa makes a large angle with respect to the surface normal, there may be an appreciable time difference "Δt". In another or further embodiment, the time difference "Δt" in a subset of arrival times "Ta" depends on a wave velocity "C" of the acoustic waves. For example, the slower the acoustic waves, the larger the time difference "Δt" and vice versa. In another or further embodiment, the time difference "Δt" in a subset of arrival times "Ta" depends on a surface distance ΔS between a set of transducers measuring the respective time difference. For example, the further apart the transducers, the larger the time difference "Δt", and vice versa. In a preferred embodiment, a subset arrival times is measured for each transducer in the subarray. From this subset, an overall trend in time differences may be more accurately determined, e.g. by determining a slope of the arrival time as function of transducer location.

In one embodiment, the wave direction θa of a subarea is calculated using the relation, θa=sin⁻¹ C·Δt/ΔS, or any equivalent equation. Also more sophisticated methods and equations can be used such as the (linear) Radon transform which will be discussed further below. Typically, these equations may be easiest to work with if the incoming acoustic waves sufficiently approximate a plane wave. This may the case, e.g. if the distance to the wave origin is larger than the size of the subarray, e.g. by at least a factor ten. For example, this can be easily ensured by using a minimum arrival time. Furthermore, it may be assumed that transducers in the subarray are approximately located in a flat plane. This may be ensured, e.g. by limiting an extent of the subarray and/or by adding local stiffness to keep each subarray in an approximate planar formation. Alternative to using plane wave equations, in principle, the equations can also be adapted to take into account a curved wave front which may be a function of distance to the origin. Alternative to assuming planar subarrays, the equations may also allow local curvature, e.g. further fitting the individual transducer positions in accordance with the overall modelled shape and local curvature of the flexible sheet.

Figure 4B:
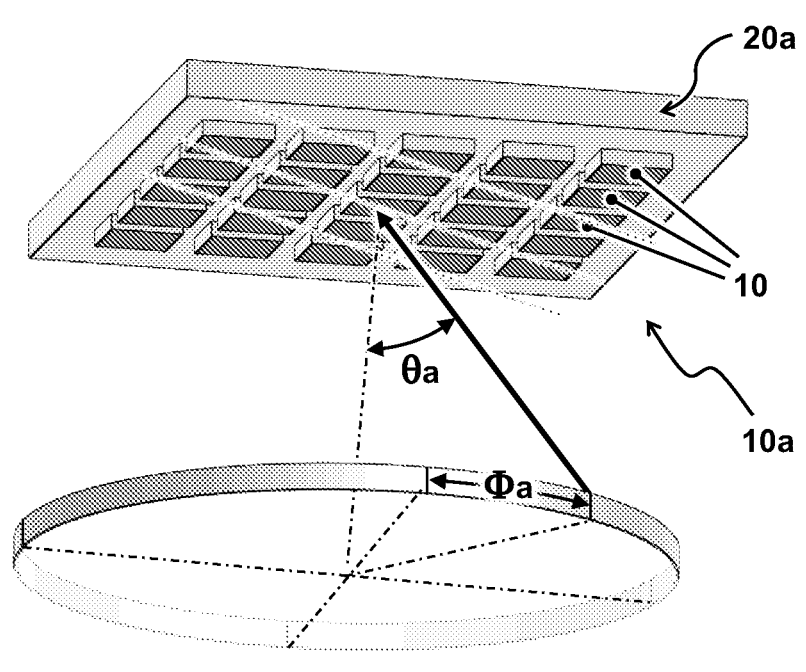
FIG. 4B illustrates determining angles of the wave direction using a two dimensional subarray of the transducers covering a subarea of the flexible sheet.

FIG. 4B illustrates determining angles θa,Φa of the wave direction using a two dimensional subarray 10*a* of the transducers 10 covering a subarea 20*a* of the flexible sheet. While the embodiments described herein can be explained with reference to illustrations of a one dimensional array of transducers, it will be understood that the teachings can generally apply to two dimensional arrays. In case of a two-dimensional array, the respective wave direction may be described by two angular coordinates, e.g. using polar angle θa with respect to the surface normal, and an azimuthal angle Φa determining direction around the normal. For example, the azimuthal angle Φa can be determined by interpolating lines through the subarray where the acoustic waves arrive simultaneously (and taking an azimuthal direction perpendicular to those lines). Similarly, the polar angle θa can be calculated by determining time differences Δt and surface distances ΔS perpendicular to the lines of simultaneous arrival (along the azimuthal direction). Alternatively, or additionally also the more sophisticated methods and equations can be used such as the 2D linear Radon transform.

Figure 5A:
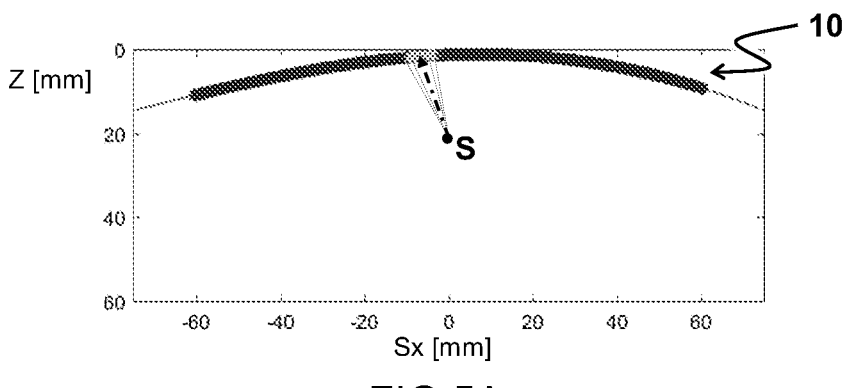
FIGS. 5A-5C illustrate calculating a linear Radon transform for a respective subarray of transducers.

FIG. 5A illustrates modelled transducers 10 arranged according to a curved shape and configure to measure acoustic waves from a common scattering element "S". The light colored part indicates a specific subarray.

Figure 5B:
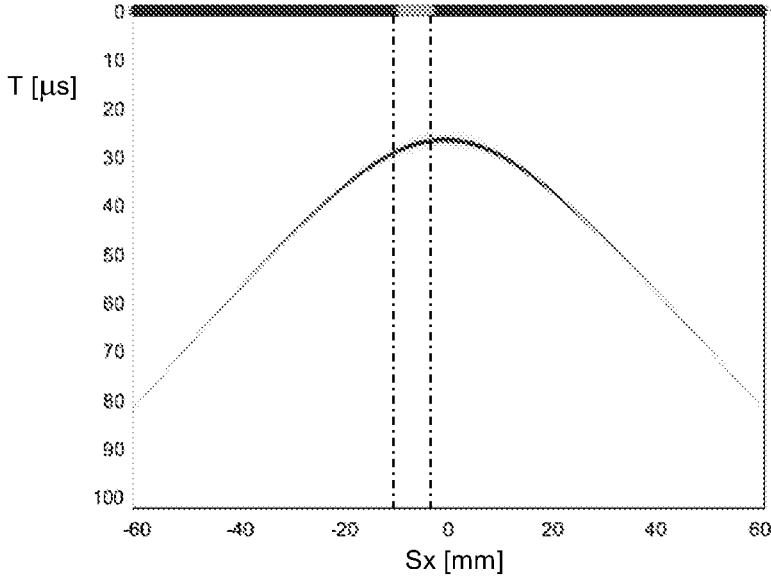

FIG. 5B illustrates a scatterplot of resulting arrival times "T" for each transducer in the array as function of their respective surface coordinate "Sx". For reference, the array is drawn on top as a straight line although the arrival times are calculated for the shape shown in the previous figure.

Figure 5C:
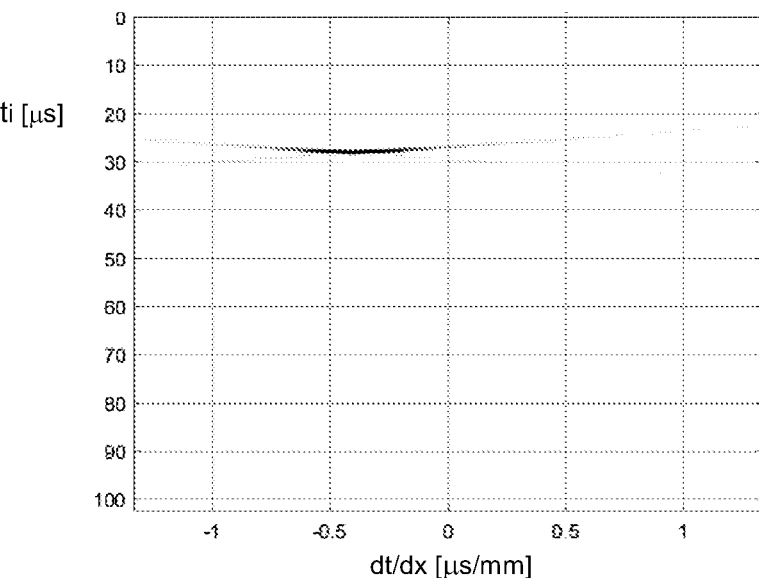

FIG. 5C illustrates the linear Radon transform of a subset of arrival times in the specific subarray indicated in the preceding figure. The Radon transform measures a direction of propagation of a plane wave and arrival time as centre of sub-array. For example, this can be mathematically formulated as $$\hat{P}(p_x, f) = \int P(x, f)e^{-i\omega p_x x} dx dy$$

where $$p_x = \frac{\sin\theta}{c},$$

c: speed of sound in medium
x: array position, zero is centre of sub-array
For example, calculation may involve selecting a window of the recorded wave field e.g. the light indicated subarray; defining the zero-position in the transform as the centre position of the array and perform transform. After transforming back to the time domain, the recorded response can be shown as function of ray-parameter and intercept time (e.g. arrival time at x=0). For visualization, the envelope of the rf-signal can be shown. For example, taking the maximum value as function of intercept time can give a single peak indicating the best estimate of the direction of propagation.

Figures 6A, 6B, 6C, 6D:
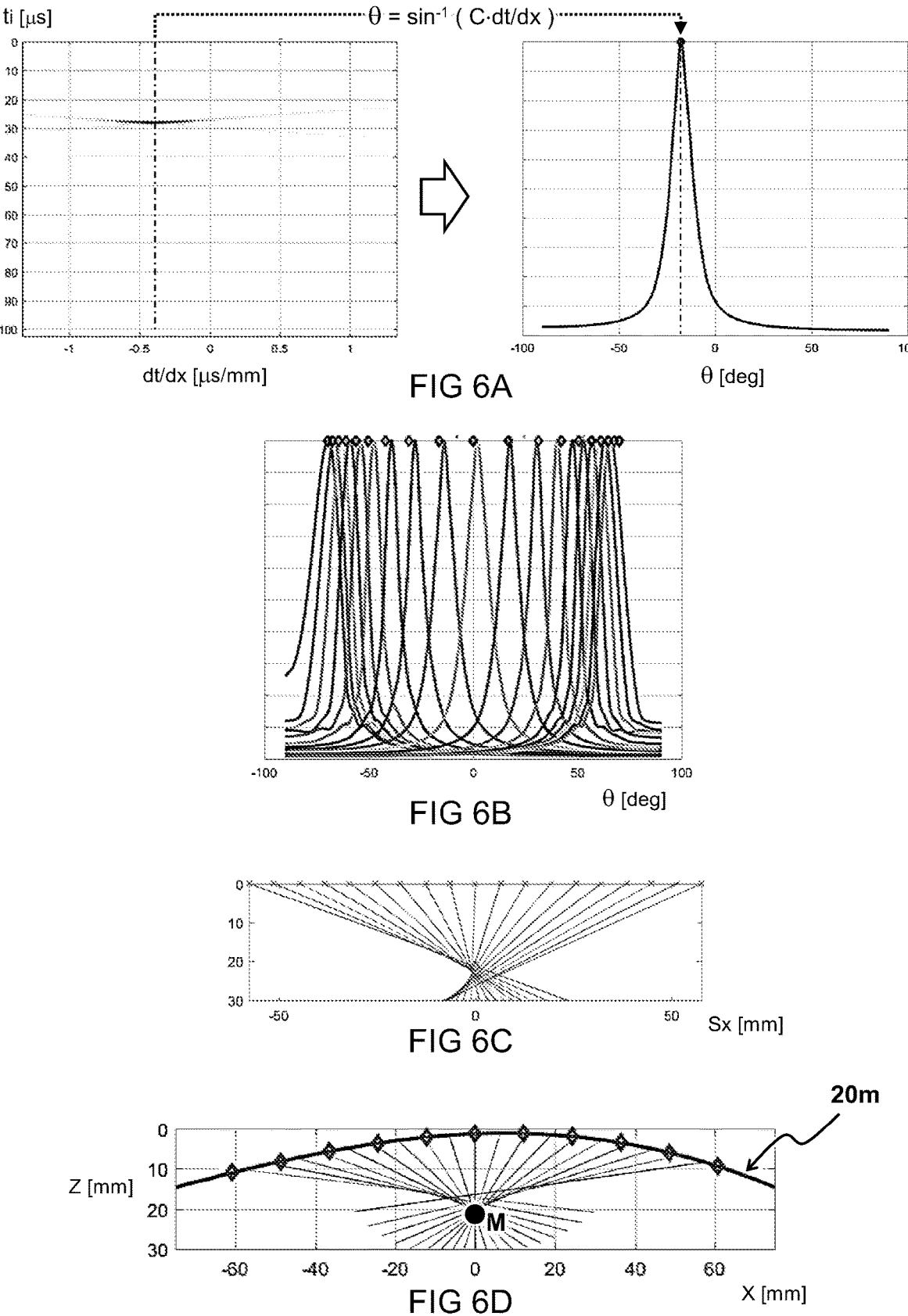
FIGS. 6A-6D illustrate using the Radon transform to derive respective wave directions and determine a modelled shape wherein these directions can be fitted through a common point of origin.

FIG. 6A illustrates calculating a (dominant) wave direction θ based on the linear Radon transform of arrival times on a respective subarea of the transducer array. For example, each point in the scatterplot of the radon transform on the left is converted to a respective angle using the formula as shown. This uses the effective wave velocity "C" which in case of a pulse echo experiment can be taken as half the actual wave velocity (since each wave may traverse the path back and forth). The converted points are plotted in a histogram shown on the right side. The peak of the histogram can be fitted to yield the wave direction θ on the respective subarray. FIG. 6B illustrates respective peaks indicating wave directions measured at each of the subarrays. For comparison, the dots at the top of the figure show the expected positions of the peaks in case the array were not curved. In essence, the shifts of the peaks may be used to indicate the amount of curvature. FIG. 6C illustrates line segments at respective angles corresponding to the wave directions starting from a planar modelled shape. As shown, the line segments do not intersect a common point in this case because the subarrays are not properly oriented. FIG. 6D illustrates a modelled shape 20m wherein the line segments are fitted through a common point of origin. In this case, the shape substantially corresponds to the actual input arrangement of transducers.

Figure 7A:
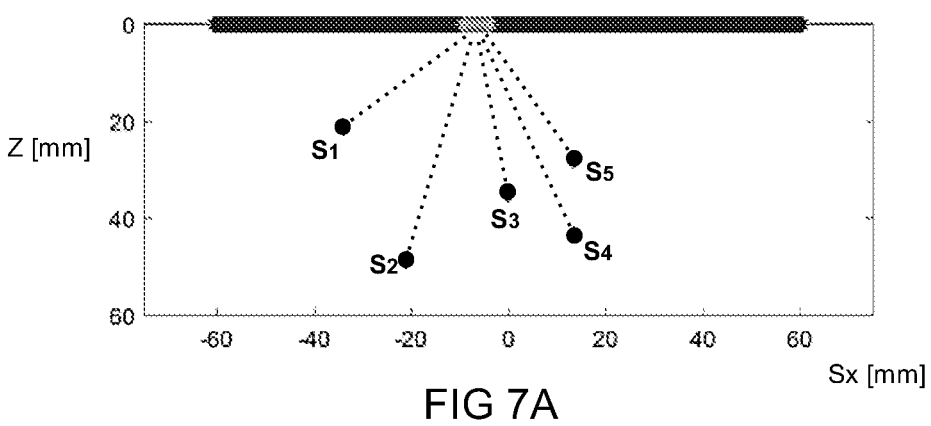
FIGS. 7A-7C illustrate using the Radon transform to isolate measurements from different scattering elements.
Figure 7B:
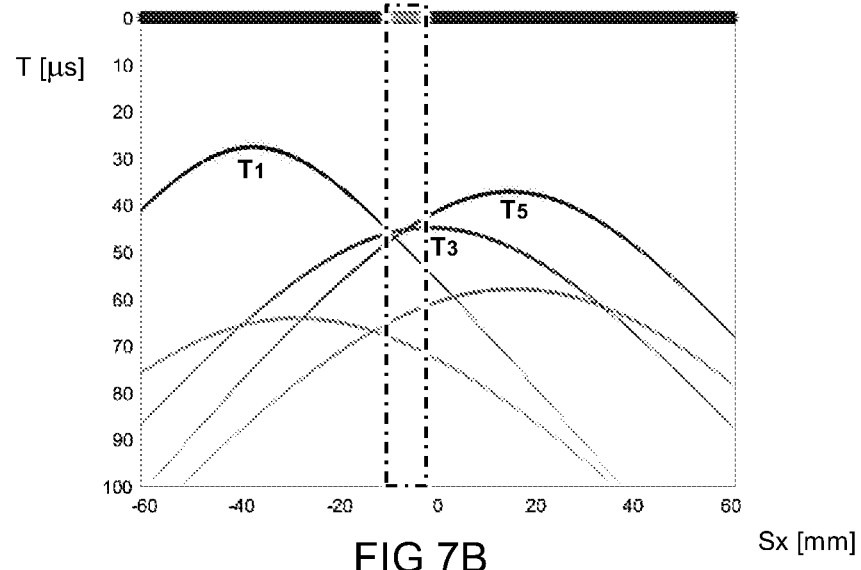
Figure 7C:
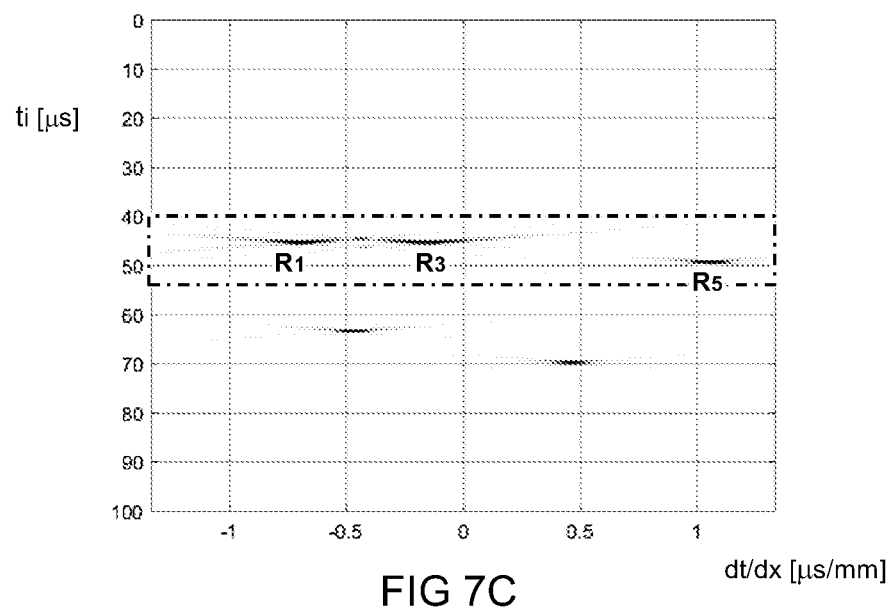

FIG. 7A illustrates an arrangement of different scattering elements, each sending/refracting respective waves to each of the subarrays. FIG. 7B illustrates arrival times T (e.g. roundtrip times) as function of the surface coordinate Sx. As shown, each subarray may detect multiple arrival times corresponding to different scattering elements. At some of the transducers, there may be substantial overlap between the arrival times, e.g. as indicated for the subarray in the dash-dotted box. FIG. 7C illustrates the corresponding Radon transform of the subarray data in the preceding figure. As illustrated by this plot, data which substantially overlap in the preceding plot may be well separated in the Radon transform owing to the different wave directions of the scattering elements S1,S3,S5. So, in some embodiments, the Radon transform is used in case of multiple scattering elements, to isolate data corresponding to one of the scattering elements.

Figure 8A:
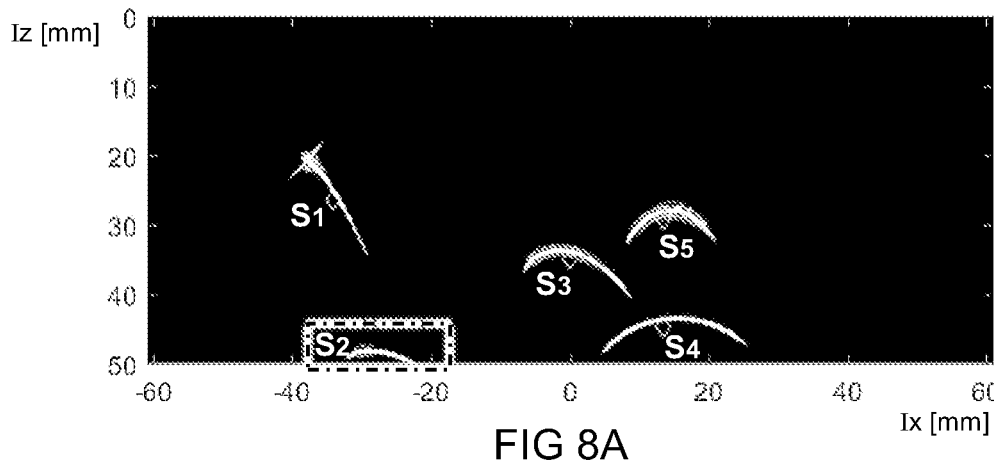
FIGS. 8A-8C illustrate using inverse imaging to isolate measurements from different scattering elements.
Figure 8B:
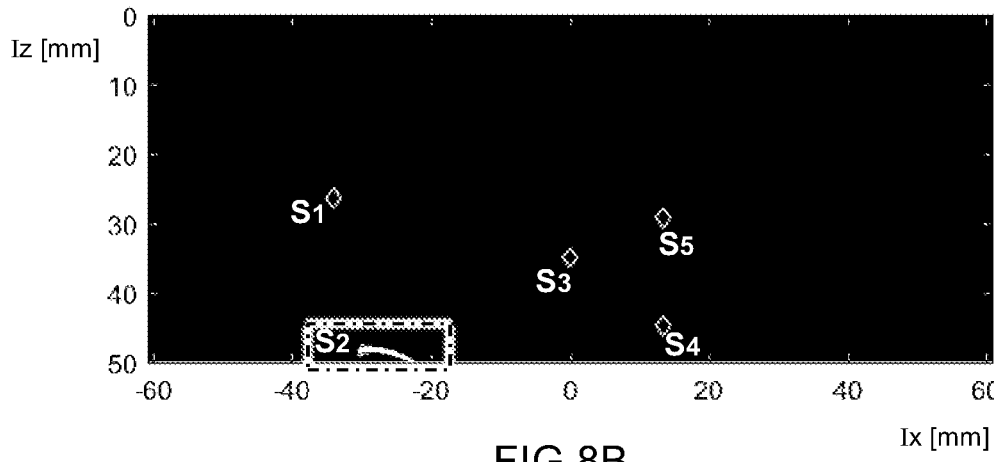
Figure 8C:
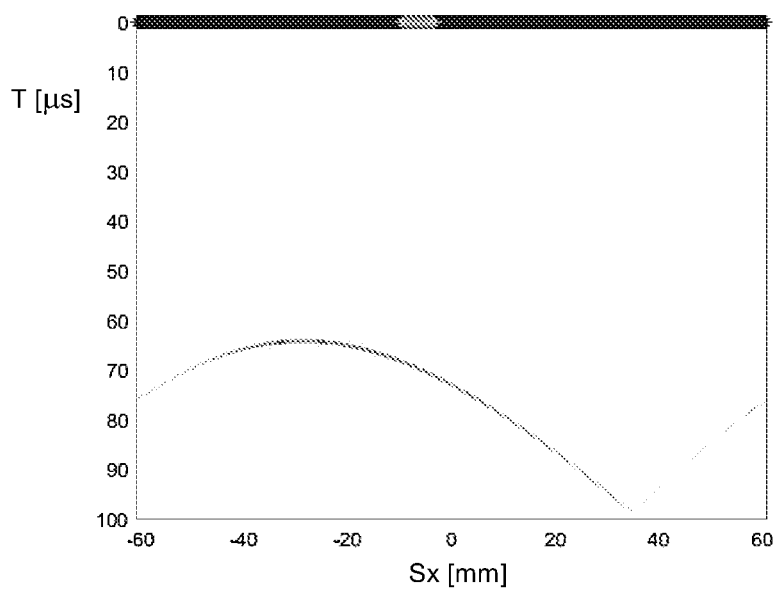

FIG. 8A illustrates a curved object having multiple scattering elements imaged without taking into account the curvature of the measuring array. As illustrated, the image with imaging coordinates (Ix,Iz) may be highly distorted without correcting for the actual transducer positions. Nevertheless, it may be possible to recognize distinct scattering elements. FIG. 8B illustrates the same image but filtered to keep only the data corresponding to one of the scattering elements. This is also referred to as windowing. FIG. 8C illustrates inverse-imaging of the filtered image. As shown this may be used to effectively isolate the arrival times of a single scattering element. This can then be used as input for the earlier described methods of calculating respective wave directions to this single scattering element. Accordingly, some embodiments comprise one or more steps of, generating an (ultrasound) image based on the arrival times for all transducers in the array (e.g. without taking into account the respective positions of the transducers); selecting a single (isolated) scattering element based on the imaging data and filtering out imaging data corresponding to other scattering elements to generate a filtered image; inverse-imaging the filtered image to generate a filtered set of arrival times T for a selected common scattering element "S"; and performing the steps as described herein based on the filtered set of arrival times T, e.g. calculating the wave directions θa, θb, θc at which respective parts of the acoustic waves "Wa", "Wb", "Wc" arrive on the subarrays from the selected common scattering element "S". Optionally, the procedure can be repeated also for one or more other selected scatting elements, each time yielding a respective set of wave directions and/or distances to the respective scattering element. For example, the model shape fitting as illustrated in FIGS. 3A-3B can then be used.

For the purpose of clarity and a concise description, features are described herein as part of the same or separate embodiments, however, it will be appreciated that the scope of the invention may include embodiments having combinations of all or some of the features described. Aspects described with reference to particular systems and devices can also be embodied as corresponding methods for acoustically measuring a curved object. In one embodiment, the method comprises providing a flexible sheet with an array of acoustic transducers distributed over a sheet surface of the flexible sheet. In another or further embodiment, the method comprises wrapping the flexible sheet at least partially around the curved object such that the acoustic transducers acoustically contact the curved object "Obj" from different sides. In another or further embodiment, the method comprises using the acoustic transducers to generate and/or measure acoustic waves at variable locations around the curved object. For example, the spatial coordinates of the variable locations in three dimensional space are dependent on a deformation of the sheet surface wrapping around the curved object. In another or further embodiment, the method comprises determining the spatial coordinates of the acoustic transducers, preferably while the flexible sheet is wrapped around the curved object "Obj". In a preferred embodiment, the method further comprises imaging and/or measuring the curved object based on acoustic waves generated and/or measured by the acoustic transducers, and their spatial coordinates determined based on the set of travel times. These and other aspects can also be embodied as a computer-readable medium storing instructions that, when executed causes performance of the methods and systems described herein.

While embodiments were shown for various layouts of acoustic transducers on a flexible sheet, also alternative ways may be envisaged by those skilled in the art having the benefit of the present disclosure for achieving a similar function and result. For example, the flexible sheet may be omitted when the transducers or subarrays are placed directly on a curved object to be measured. Instead of the flexible sheet also other or similar structures can be used to hold the transducers together, e.g. flexible wires and/or a net between the transducers. The various elements of the embodiments as discussed and shown offer certain advantages, such as a self-calibrating conformable acoustic device. Of course, it is to be appreciated that any one of the above embodiments or processes may be combined with one or more other embodiments or processes to provide even further improvements in finding and matching designs and advantages. It is appreciated that this disclosure offers particular advantages to acoustic imaging, and in general can be applied for any application wherein respective positions of acoustic transducers are to be determined.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. An acoustic system for measuring a curved object, the system comprising:

a flexible sheet comprising an array of transducers distributed over a sheet surface of the flexible sheet for acoustically contacting the curved object, wherein the transducers are configured to measure acoustic waves at variable locations relative to each other, and wherein spatial coordinates of the variable locations in three dimensional space are dependent on a deformation of the sheet surface contacting the curved object; and a controller configured to perform:

determining, for different transducers in the array of transducers, a set of arrival times of acoustic waves originating from a common origin;

collecting the set of arrival times into different subsets, wherein each subset of arrival times corresponds to a respective transducer subarray, of the array of transducers, spanning a respective subarea of the flexible sheet at respective surface coordinates along the sheet surface;

determining, based on the respective subset of arrival times for each transducer subarray, of the array of transducers, a respective wave direction at which respective parts of the acoustic waves arrive at the respective subarea originating from the common origin;

determining a modelled shape of the sheet surface based at least in part on the respective wave direction as a function of the surface coordinates of a respective subarea; and determining the spatial coordinates of the transducers based on the modelled shape of the sheet surface.

2. The acoustic system according to claim 1, wherein the common origin is formed by a common scattering element selected inside the curved object, and wherein the set of arrival times of the acoustic waves are based on a respective time interval between generating acoustic waves by one or more source transducers, and measuring resulting acoustic waves by receiving transducers in the respective transducer subarrays after being scattered by the common scattering element along a respective path between the source and receiving transducers.

3. The acoustic system according to claim 1, wherein determining the modelled shape comprises determining a set of line segments, wherein each line segment is kept fixedly connected to a respective subarea, wherein each fixedly connected line segment intersects a respective subarea at a fixed angle corresponding to the respective wave direction at which the acoustic waves arrive at the respective subarea; and orienting the subareas to intersect corresponding fixedly connected line segments at a common point of origin corresponding to a model of the common origin.

4. The acoustic system according to claim 3, wherein one or more of the line segments are modelled as having a fixed length corresponding to a distance between the respective subarea and the common origin, wherein the subareas are oriented and/or translated to overlap respective ends of the fixedly connected and fixed length line segments at the common point of origin.

5. The acoustic system according to claim 1, wherein the controller is configured to perform:

determining, based on the arrival times, respective distances between a respective subarea and the common origin; and determining the modelled shape of the sheet surface further based on one or more of the respective distances.

6. The acoustic system according to claim 1, wherein at least one transducer in each transducer subarray is configured to generate a respective acoustic wave and measure a resulting acoustic wave reflected back from a common scattering element inside the object, wherein a respective distance between the respective subarea and the common scattering element is determined based on a time interval between the generating and measuring of the respective acoustic wave.

7. The acoustic system according to claim 1, wherein the subareas in the modelled shape are oriented in accordance with corresponding respective wave directions while keeping adjacent subareas interconnected at respective edges there between in accordance with a respective size and relative surface position of the subareas.

8. The acoustic system according to claim 1, wherein, during the determining a modelled shape of the sheet surface, the modelled shape is determined by a constrained fit that uses the wave directions as input, wherein the fit is further constrained by one or more constrains taken from the group consisting of:

respective surface coordinates of the transducer subarrays, a respective size of the transducer subarrays, a respective surface distance between a pair of transducer subarrays or pair of transducers, a respective distance between a respective subarray and the common origin, a Euclidean distance between a pair of transducers through the object, and a parametric function describing the modelled shape.

9. The acoustic system according to claim 1, wherein the controller is configured to perform calculating a respective wave direction using a linear Radon transform of the respective subset of arrival times as a function of one or more surface coordinates of the transducers in the respective transducer subarray.

10. The acoustic system according to claim 1, wherein the controller is configured to perform:

generating an ultrasound image based on the arrival times for all transducers in the array;

selecting a single scattering element based on the ultrasound image;

filtering out imaging data in the ultrasound image corresponding to other scattering elements to generate a filtered image;

inverse-imaging the filtered image to generate a filtered set of arrival times for the selected single scattering element; and determining the wave directions at which respective parts of the acoustic waves arrive on the transducer subarrays based on the filtered set of arrival times corresponding to the selected single scattering element.

11. The acoustic system according to claim 1, wherein the controller is configured to perform:

determining a first set of arrival times of acoustic waves having interacted with a first scattering element inside the curved object;

determining a second set of arrival times of acoustic waves having interacted with a distinct, second scattering element inside the curved object;

dividing each set of arrival times into a respective collection of subsets corresponding to the transducer subarrays;

determining, based on the two collections of subsets for each scattering element and for each transducer subarray, a respective at least two wave directions of the acoustic waves arriving at the respective transducer subarray from two directions originating from the first or second scattering element, respectively;

determining a modelled shape of the sheet surface based at least in part on the at least two wave directions per transducer subarray as function of the surface coordinates of the subarea; and determining the spatial coordinates of the transducers based on the modelled shape of the sheet surface.

12. The acoustic system according to claim 1, wherein the controller is configured to perform determining the spatial coordinates of the transducers further based at least in part on a set of travel times of acoustic waves sent directly between transducers of different transducer subarrays at least partially facing each other at different sides of the curved object.

13. The acoustic system according to claim 1, wherein the controller is configured to perform generating an image of the curved object using the array of transducers, wherein the generating the image is performed based on acoustic waves generated and/or measured by the transducers, and spatial coordinates of the transducers determined based at least in part on the wave directions.

14. A method for acoustically measuring a curved object, the method comprising:

providing a flexible sheet with an array of transducers distributed over a sheet surface of the flexible sheet;

wrapping the flexible sheet at least partially around the curved object such that the array of transducers acoustically contact the curved object;

using the array of transducers to measure acoustic waves at variable locations around the curved object, wherein spatial coordinates of the variable locations in three dimensional space are dependent on a deformation of the sheet surface wrapping around the curved object; and determining the spatial coordinates of the acoustic transducers, while the flexible sheet is wrapped around the curved object, based on a set of travel times of the acoustic waves sent through the curved object originating from a common origin, wherein the determining the spatial coordinates comprises:

collecting the set of arrival times into different subsets, wherein each subset of arrival times corresponds to a respective transducer subarray of the array of transducers, spanning a respective subarea of the flexible sheet at respective surface coordinates along the sheet surface;

determining, based on the respective subset of arrival times for each transducer subarray, of the array of transducers, a respective wave direction at which respective parts of the acoustic waves arrive at the respective subarea originating from the common origin;

determining a modelled shape of the sheet surface based at least in part on the respective wave direction as a function of the surface coordinates of a respective subarea; and determining the spatial coordinates of the transducers based on the modelled shape of the sheet surface.

15. A non-transitory computer-readable medium storing instructions that, when executed by an acoustic system, causes the acoustic system to perform:

controlling an array of transducers to measure acoustic waves at variable locations around a perimeter of a curved object, wherein spatial coordinates of the variable locations in three dimensional space depend on the perimeter of the curved object;

determining the spatial coordinates of the transducers based on a set of travel times of the acoustic waves sent through the curved object originating from a common origin; and generating an image of the object by processing acoustic signals measured from at least a transducer subarray of the array of transducers, wherein the acoustic signals are processed based on the determined spatial coordinates, wherein the determining the spatial coordinates comprises:

collecting the set of arrival times into different subsets, wherein each subset of arrival times corresponds to a respective transducer subarray of the array of transducers spanning a respective subarea of the flexible sheet at respective surface coordinates along the sheet surface;

determining, based on the respective subset of arrival times for each transducer subarray of the transducers, a respective wave direction at which respective parts of the acoustic waves arrive at the respective subarea originating from the common origin;

determining a modelled shape of the sheet surface based at least in part on the respective wave direction as function of the surface coordinates of a respective subarea; and determining the spatial coordinates of the transducers based on the modelled shape of the sheet surface.

\* \* \* \* \*